(12) United States Patent
Sakai

(10) Patent No.: US 12,257,961 B2
(45) Date of Patent: Mar. 25, 2025

(54) CLAMP AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Tatsuro Sakai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 154 days.

(21) Appl. No.: 18/030,108

(22) PCT Filed: Jul. 29, 2021

(86) PCT No.: PCT/JP2021/028040
§ 371 (c)(1),
(2) Date: Apr. 4, 2023

(87) PCT Pub. No.: WO2022/079977
PCT Pub. Date: Apr. 21, 2022

(65) Prior Publication Data
US 2024/0017684 A1   Jan. 18, 2024

(30) Foreign Application Priority Data
Oct. 14, 2020   (JP) .................................. 2020-172952

(51) Int. Cl.
*F16B 2/06*   (2006.01)
*B60R 16/02*   (2006.01)

(52) U.S. Cl.
CPC ............ *B60R 16/0215* (2013.01); *F16B 2/06* (2013.01)

(58) Field of Classification Search
CPC ....... B60R 16/0215; B60R 16/02; F16B 2/06; F16B 2/08; F16B 2/22; F16B 5/06; H01B 7/00; H02G 3/30; H02G 3/32
(Continued)

(56) References Cited

U.S. PATENT DOCUMENTS

| 4,417,775 A * | 11/1983 | Sakurai ............... B60R 21/2035 |
| | | 439/15 |
| 2020/0011357 A1* | 1/2020 | Fukami .................... H02G 3/32 |
| 2021/0339690 A1* | 11/2021 | Kimoto ............... B60R 16/0215 |

FOREIGN PATENT DOCUMENTS

| JP | H06-087101 U1 | 12/1994 |
| JP | 2011-024356 A | 2/2011 |
| JP | 2020-021556 A | 2/2020 |

OTHER PUBLICATIONS

International Search Report issued on Oct. 5, 2021 for WO 2022/079977 A1 (4 pages).

* cited by examiner

*Primary Examiner* — Timothy J Thompson
*Assistant Examiner* — Michael F McAllister
(74) *Attorney, Agent, or Firm* — Venjuris, P.C.

(57) ABSTRACT

According to an embodiment of the present disclosure, there are provided a clamp and a wire harness which are capable of enhancing versatility. This clamp (30) is applied to two electric wires (20), which respectively have core wires (21) all having flat cross-sectional shapes and are parallel to each other, is configured to be fixable to a panel P, and holds the two electric wires (20). The clamp (30) comprises: a fixed member (40) fixed to the panel P; and two holding members (Continued)

(50) which are detachably attached to the fixed member (40) and respectively hold the two electric wires (20).

6 Claims, 4 Drawing Sheets

(58) Field of Classification Search
 USPC ..................................................... 174/72 A
 See application file for complete search history.

CLAMP AND WIRE HARNESS

TECHNICAL FIELD

The present disclosure relates to a clamp and a wire harness.

BACKGROUND

Patent Document 1 discloses a wire harness that includes a plurality of electric wires arranged side by side and a clamp that holds the electric wires together. The electric wires each include a core wire and an insulating coating that surrounds the core wire. A cross-section of the core wire taken perpendicular to the length direction has a flattened shape in which the size in the thickness direction is smaller than the size in the width direction.

In a section that extends under the floor of a vehicle, for example, the wire harness includes a portion that extends in a straight line in the front-rear direction of the vehicle, a portion that is bent in the vehicle width direction from the portion extending in a straight line, and a portion that is bent in the up-down direction from the portion extending in a straight line. In the portions where the wire harness is bent, the core wires are bent so as to be plastically deformed. Accordingly, the orientation of the wire harness is maintained along the wiring route.

PRIOR ART DOCUMENT

Patent Document

Patent Document 1: JP 2020-021556 A

SUMMARY OF THE INVENTION

Problems to be Solved

Core wires that have a flattened cross-sectional shape can be easily bent in the thickness direction, but are difficult to bend in the width direction. In order for the core wires to be bent easily, the thickness direction of each of the core wires is preferably aligned with the up-down direction at a position directly before the portion where the wire harness is to be bent in the up-down direction, and the thickness direction of each of the core wires is preferably aligned with the left-right direction at a position directly before the portion where the wire harness is to be bent in the left-right direction.

However, such a wire harness has multiple portions where the electric wires are in different orientations from each other. For this reason, it is necessary to prepare multiple types of clamps with shapes that correspond to the various portions in which the electric wires are in different orientations from each other.

An object of the present disclosure is to provide a clamp and wire harness that enable an improvement in versatility.

Means to Solve the Problem

A clamp according to an aspect of the present disclosure is a clamp applicable to two electric wires arranged side by side and each including a core wire having a flattened cross-sectional shape, the clamp being configured to be fixed to a fixing target and hold the two electric wires, the clamp including: a fixing member configured to be fixed to the fixing target; and two holding members attachable to and detachable from the fixing member and configured to hold the two electric wires in one-to-one correspondence.

A wire harness according to an aspect of the present disclosure is a wire harness including: two electric wires arranged side by side and each including a core wire; and a plurality of clamps fixable to a fixing target, each of the clamps being configured to hold the two electric wires, wherein a shape of a cross-section of each of the core wires taken orthogonal to a length direction of the core wires is a flattened shape having a size in a thickness direction that is smaller than a size in a width direction, each of the clamps includes: a fixing member configured to be fixed to the fixing target; and two holding members attachable to and detachable from the fixing member and configured to hold the two electric wires in one-to-one correspondence, the plurality of clamps include a first clamp and a second clamp, the holding members of the first clamp are configured to hold a portion of the two electric wires in which the core wires of the two electric wires are side by side with each other in the width direction, and the holding members of the second clamp are configured to hold a portion of the two electric wires in which the core wires of the two electric wires are side by side with each other in the thickness direction.

Effects of the Invention

According to the present disclosure, versatility can be improved.

DETAILED DESCRIPTION TO EXECUTE THE INVENTION

Description of Embodiments of Present Disclosure

Figure 1:
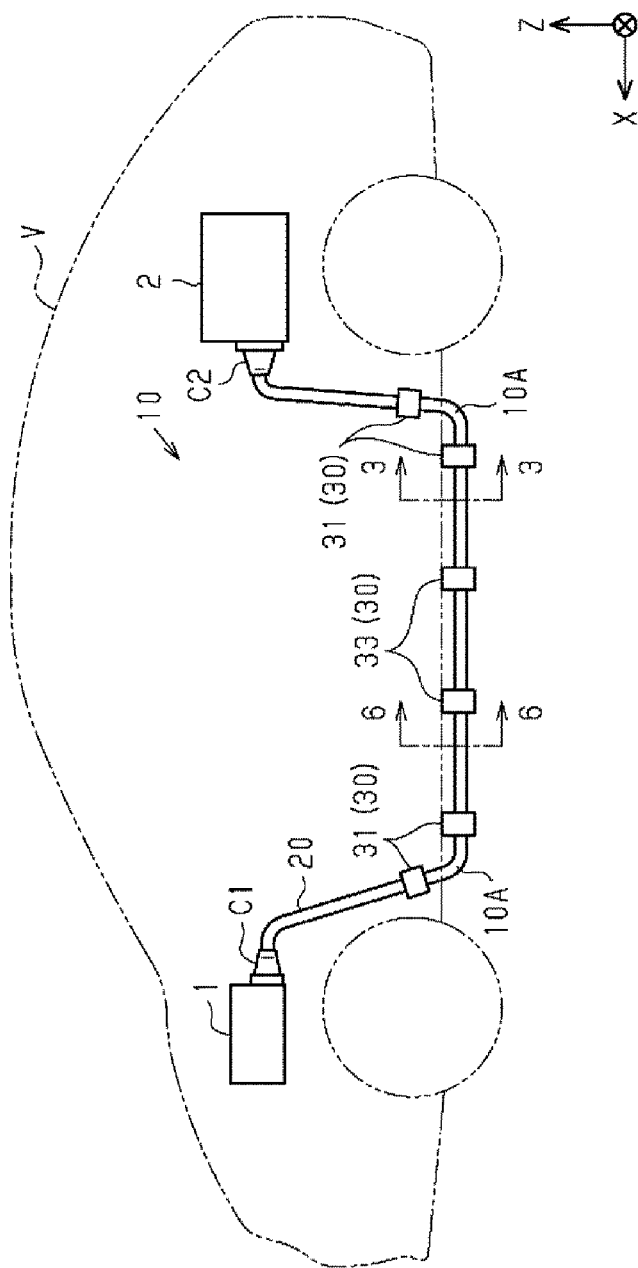
FIG. 1 is a schematic diagram showing a vehicle in which a wire harness according to an embodiment is routed.

First, embodiments of the present disclosure will be listed and described.

[1] A clamp according to an aspect of the present disclosure is a clamp applicable to two electric wires arranged side by side and each including a core wire having a flattened cross-sectional shape, the clamp being configured to be fixed to a fixing target and hold the two electric wires, the clamp including: a fixing member configured to be fixed to the fixing target; and two holding members attachable to and detachable from the fixing member and configured to hold the two electric wires in one-to-one correspondence.

According to this configuration, the two holding members can be attached to and detached from the fixing member. For this reason, by appropriately selecting two holding members whose shapes correspond to the orientation of the two electric wires, it is possible to use the same fixing member. Accordingly, the versatility of the clamp can be improved.

[2] It is preferable that the fixing member has two insertion holes spaced apart in a direction in which the two electric wires are arranged side by side, and each of the holding members includes a holding portion configured to hold the corresponding electric wire, a shaft portion configured to be inserted into a corresponding one of the insertion holes, and a connecting portion connecting the holding portion and the shaft portion.

According to this configuration, by appropriately setting the configuration of the connecting portion, such as changing the angle formed between the connecting portion and the shaft portion, it is possible to easily obtain two holding members whose shapes correspond to the orientation of the two electric wires.

[3] It is preferable that each of the insertion holes includes a restricting portion configured to engage with the corresponding shaft portion to restrict rotation of the corresponding shaft portion.

According to this configuration, the insertion holes include the restricting portions that restrict rotation of the shaft portions, and thus the holding members are positioned relative to the fixing member. Therefore, the two electric wires can be stably held in a desired orientation.

[4] It is preferable that each of the holding portions holds the corresponding electric wire due to tape being wrapped around the holding portion and the electric wire.

According to this configuration, tape is wrapped around the electric wire and the holding portion, and thus the electric wire is held by the holding member. Therefore, the clamp can hold a plurality of types of electric wires having different outer dimensions. Accordingly, the versatility of the clamp can be further improved.

Also, according to the above configuration, the holding members can be attached to and detached from the fixing member, and therefore tape can be wrapped around a holding portion and an electric wire before the holding member is attached to the fixing member, and then the holding member can be attached to the fixing member. This makes it possible to improve the workability when attaching the clamp to the electric wires.

[5] A wire harness according to an aspect of the present disclosure is a wire harness including: two electric wires arranged side by side and each including a core wire; and a plurality of clamps (30) fixable to a fixing target, each of the clamps (30) being configured to hold the two electric wires, wherein a shape of a cross-section of each of the core wires taken orthogonal to a length direction of the core wires is a flattened shape having a size in a thickness direction that is smaller than a size in a width direction, each of the clamps includes: a fixing member configured to be fixed to the fixing target; and two holding members attachable to and detachable from the fixing member and configured to hold the two electric wires in one-to-one correspondence, the plurality of clamps include a first clamp and a second clamp, the first clamp is configured to hold a portion of the two electric wires in which the core wires of the two electric wires are side by side with each other in the width direction, and the second clamp is configured to hold a portion of the two electric wires in which the core wires of the two electric wires are side by side with each other in the thickness direction.

According to this configuration, along the wiring route of the wire harness, by applying the first clamp at a position directly before a portion of the wire harness that is bent in the up-down direction for example, the two electric wires can be held in a state in which the thickness direction of each of the core wires is aligned with the up-down direction. Also, along the wiring route of the wire harness, by applying the second clamp at a position directly before a portion of the wire harness that is bent in the vehicle width direction for example, the two electric wires can be held in a state in which the thickness direction of each of the core wires is aligned with the vehicle width direction.

Moreover, according to the above configuration, the two holding members can be attached to and detached from the fixing member. Therefore, the same fixing member can be used in both the first clamp and the second clamp. Accordingly, it is possible to improve the versatility of the clamp and thus the versatility of the wire harness.

[6] It is preferable that the plurality of clamps further include a third clamp, and the third clamp is configured to hold a portion of the two electric wires that is between the portion held by the first clamp and the portion held by the second clamp, the portion held by the third clamp being a portion in which the core wires of the two electric wires are each inclined relative to the fixing member such that a distance between the core wires changes with increasing distance from the fixing member.

According to the above configuration, in the portion of the two electric wires between the portion held by the first clamp and the portion held by the second clamp, the core wires of the two electric wires are each inclined relative to the fixing member such that the distance between the core wires changes with increasing distance from the fixing member. Therefore, according to the above configuration, the two electric wires can be stably held in the portion of the two electric wires between the portion held by the first clamp and the portion held by the second clamp.

DETAILS OF EMBODIMENTS OF PRESENT DISCLOSURE

Embodiments

Specific examples of a clamp and a wire harness according to aspects of the present disclosure will be described below with reference to the drawings. In the drawings, the configurations may be partially exaggerated or simplified for convenience in the description. Also, the dimensional ratios of various portions may differ among the drawings. Note that the present disclosure is not limited to these examples, but rather is indicated by the scope of the claims, and is intended to include all modifications within the scope and meaning equivalent to the scope of the claims. The terms "parallel" and "orthogonal" in this specification include not only strictly parallel and orthogonal relationships, but also approximately parallel and orthogonal relationships to the extent that effects of the present embodiment are achieved.

(Overall Configuration of Wire Harness 10)

Figure 2:
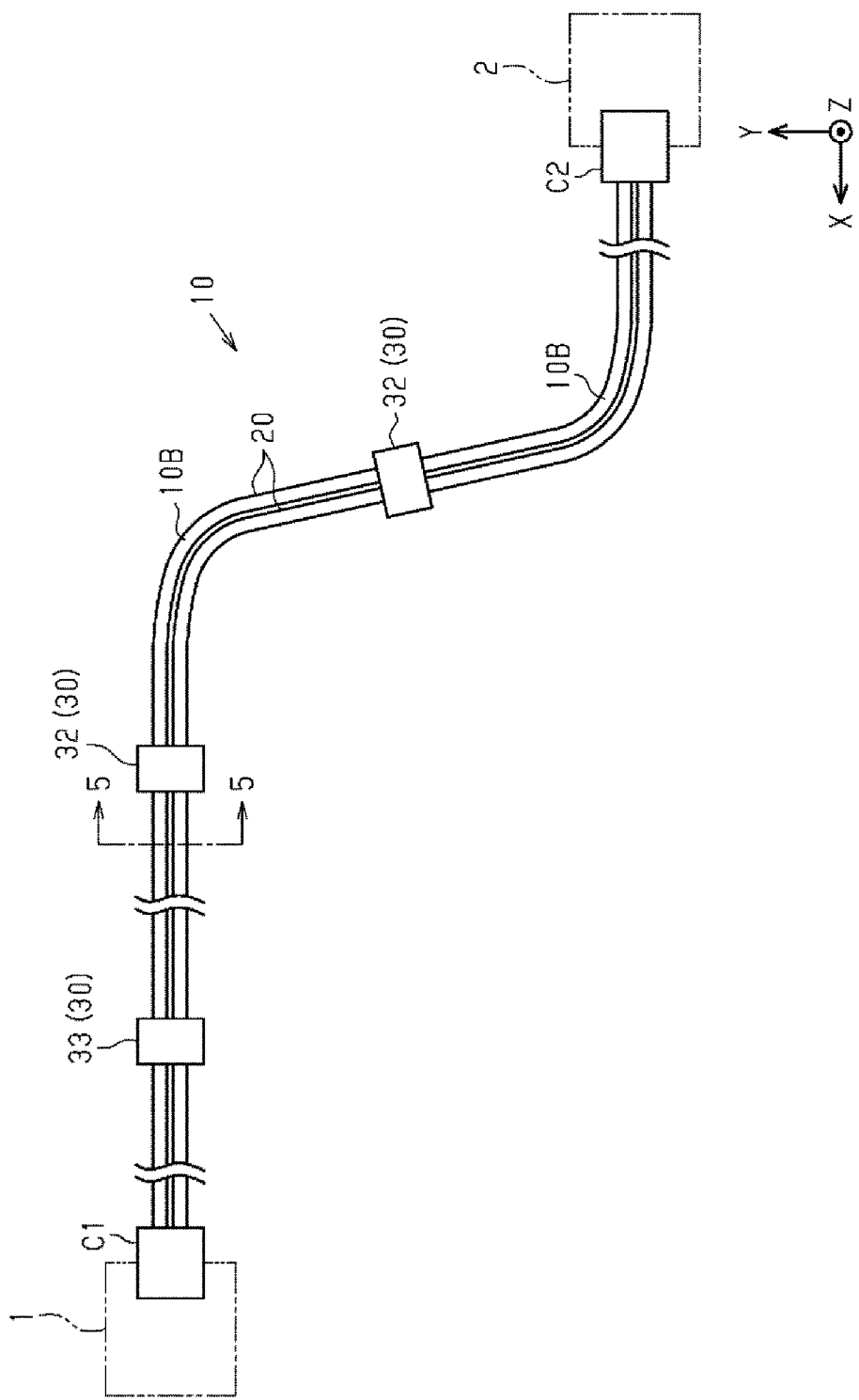
FIG. 2 is a plan view of the wire harness.

As shown in FIGS. 1 and 2, a wire harness 10 electrically connects two or three or more electrical devices to each other. For example, the wire harness 10 electrically connects an inverter 1, which is installed in the front portion of a vehicle V such as a hybrid vehicle or an electric vehicle, to a high-voltage battery 2, which is installed in the vehicle V at a position rearward of the inverter 1. The wire harness 10 is routed so as to pass under the floor of the vehicle V, for example. For example, an intermediate portion of the wire harness 10 in the length direction is routed so as to pass under the floor of the vehicle V outside the vehicle compartment.

The inverter 1 is connected to a wheel drive motor (not shown), which is a power source for vehicle traveling. The inverter 1 generates AC power from DC power provided by the high-voltage battery 2, and supplies the AC power to the motor. The high-voltage battery 2 is a battery capable of supplying several hundred volts, for example.

The wire harness 10 includes two electric wires 20 arranged side by side with each other, and a plurality of clamps 30 that hold the two electric wires 20. Also, connectors C1 and C2 are respectively attached to the two ends of the two electric wires 20. One end of each electric wire 20 is connected to the inverter 1 via the same connector C1, and the other end of each electric wire 20 is connected to the high-voltage battery 2 via the same connector C2. Note that the electric wires 20 are not required to be connected to the same electrical device.

Here, the left-right direction in FIG. 1 is the front-rear direction of the vehicle, the up-down direction in FIG. 2 is the width direction of the vehicle, and the up-down direction in FIG. 1 is the up-down direction of the vehicle. In the following description, for convenience, the direction extending in the front-rear direction of the vehicle will be referred to as the X-axis direction, the direction extending in the width direction of the vehicle will be referred to as the Y-axis direction, and the direction extending in the up-down direction of the vehicle will be referred to as the Z-axis direction.

(Configuration of Electric Wire 20)

The electric wires 20 extend while bending three-dimensionally in the X-axis direction, the Y-axis direction, and the Z-axis direction. The electric wires 20 are high-voltage electric wires capable of handling a high voltage and a high current, for example. The electric wires 20 may each be a non-shielded electric wire that does not itself have an electromagnetic shielding structure, or a shielded electric wire that itself has an electromagnetic shielding structure.

The two electric wires 20 are covered with a tubular exterior member (not shown), for example. The exterior member is provided so as to surround a portion of the outer circumference of the electric wires 20 in the length direction, for example. One example of the exterior member is a corrugated tube having a bellows structure in which annular protrusions and annular recesses are alternately arranged along the length direction.

Figures 3, 4:
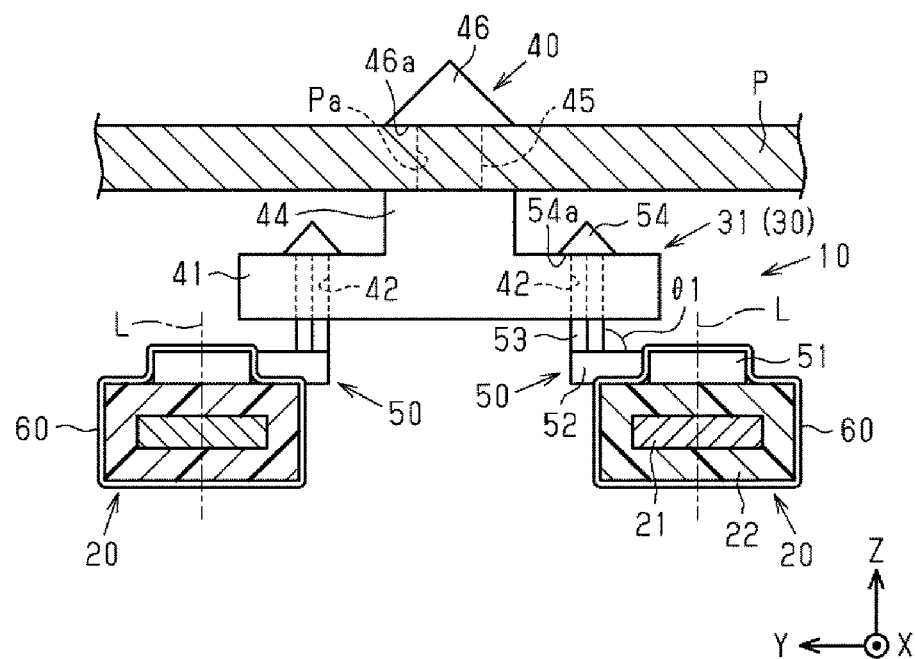
FIG. 3 is a cross-sectional view taken along line 3-3 in FIG. 1.
FIG. 4 is a plan view of a clamp in a state in which a fixing member and a holding member are separated.

As shown in FIG. 3, each of the electric wires 20 includes a core wire 21 made of a conductor and an insulating coating 22 that surrounds the core wire 21.

(Configuration of Core Wire 21)

Examples of the core wire 21 include a stranded wire in which a plurality of metal electric wires are twisted together, a columnar conductor (single core wire, bus bar, etc.) constituted by a single columnar metal rod having a solid structure, and a tubular conductor (pipe conductor) having a hollow structure. The core wire 21 is constituted by a stranded wire, for example. The core wire 21 can be made of a metal material such as copper or aluminum. The core wire 21 is formed by extrusion molding, for example.

The cross-sectional shape of the core wire 21, that is to say the shape of a cross-section taken orthogonal to the length direction of the core wire 21, is a flattened shape in which the size in the thickness direction is smaller than the size in the width direction. The core wire 21 is formed by compressing a stranded wire having a circular cross-sectional shape with a mold or the like so as to obtain a flattened cross-sectional shape, for example. As used herein, the term "flattened shape" includes rectangular, oval, and elliptical shapes, for example. The term "rectangular" as used herein refers to a shape that has long sides and short sides, and excludes a square. Also, the term "rectangular" as used herein includes a shape with chamfered edges and a shape with rounded edges.

The cross-sectional shape of the core wire 21 is a rectangle having long sides and short sides, for example. The cross-sectional shape of the core wire 21 is the same along the entirety of the length direction of the core wire 21, for example.

(Configuration of Insulating Coating 22)

The insulating coating 22 completely surrounds the outer peripheral surface of the core wire 21 in a tight contact state, for example. The outer peripheral surface of the insulating coating 22 extends along the outer peripheral surface of the core wire 21, for example. The cross-sectional shape of the insulating coating 22 is an annular shape with a rectangular outer peripheral edge and inner peripheral edge, for example. The insulating coating 22 is made of an insulating material such as a synthetic resin, for example. The insulating coating 22 can be formed by extrusion molding on the core wire 21, for example.

(Clamp 30)

The clamps 30 are configured to be fixable to a panel P that covers the underside of the vehicle V. The panel P is an example of the fixing target.

The clamps 30 each include a fixing member 40 that is to be fixed to the panel P and two holding members 50 for holding two electric wires 20. The holding members 50 can be attached to and detached from the fixing member 40.

(Configuration of Fixing Member 40)

The fixing member 40 includes a base portion 41, a projecting portion 44 that projects from the base portion 41, a support shaft 45 that extends from the projecting portion 44, and an engaging portion 46 provided at the leading end of the support shaft 45. The base portion 41, the projecting portion 44, the support shaft 45, and the engaging portion 46 are integrated with each other and formed using a resin material, for example.

As shown in FIG. 4, the base portion 41 is shaped as a rectangular plate that is elongated in the direction in which the two electric wires 20 are side by side (hereinafter referred to as the arrangement direction) in plan view, for example. Note that the arrangement direction coincides with the left-right direction in FIG. 4. The term "in plan view" used herein refers to viewing an object from the normal direction of the panel P.

The base portion 41 has two insertion holes 42 spaced apart in the arrangement direction. The insertion holes 42 pass through the base portion 41 in the thickness direction. The insertion holes 42 each have a pentagonal shape in plan view. This pentagonal shape is a shape obtained by cutting one corner of a square by a line segment parallel to the diagonal line between two corners adjacent to the one corner. The two insertion holes 42 are provided such that the aforementioned diagonal lines are parallel to each other.

The insertion holes 42 each have a restricting portion 42*a* that engages with a later-described shaft portion 53 of the corresponding holding member 50 to restrict rotation of the shaft portion 53. In the present embodiment, rotation of the shaft portion 53 about the axis thereof is restricted by the inner surface of the insertion hole 42 engaging with the outer surface of the shaft portion 53. In other words, the inner surface of the insertion hole 42 functions as the restricting portion 42*a*.

The base portion 41 has two slits 43 spaced apart in the arrangement direction. The slits 43 pass through the base portion 41 in the thickness direction and extend in the arrangement direction. Each of the slits 43 has one side that is open at an end surface of the base portion 41 in the arrangement direction. The other ends of the slits 43 are continuous with the insertion holes 42. Each of the slits 43 gradually decreases in width from the one end of the slit 43 toward the other end. The width of the slit 43 at the other end is smaller than the maximum width of the insertion hole 42 in plan view, that is to say the length of the aforementioned diagonal line.

As shown in FIG. 3, the projecting portion 44 projects toward the panel P from the central portion, with respect to the arrangement direction, of the base portion 41. The projecting portion 44 is disk-shaped, for example. The projecting portion 44 is in contact with the panel P.

The support shaft 45 has a cylindrical shape, for example. The diameter of the support shaft 45 is smaller than the diameter of the projecting portion 44. The support shaft 45 is inserted into an attachment hole Pa that passes through the panel P. The attachment hole Pa has a circular shape in plan view, for example.

The engaging portion 46 projects circumferentially outward from the leading end of the support shaft 45. The engaging portion 46 has a conical shape, for example. The outer diameter of a bottom surface 46a of the engaging portion 46 is larger than the outer diameter of the attachment hole Pa. The engaging portion 46 is configured to be able to be inserted into the attachment hole Pa by elastically deforming. The engaging portion 46 is configured to be engageable with a portion of the panel P that is continuous with the attachment hole Pa.

When the engaging portion 46 is inserted into the attachment hole Pa, the engaging portion 46 elastically deforms such that the diameter of the bottom surface 46a of the engaging portion 46 decreases. After the engaging portion 46 passes through the attachment hole Pa, the engaging portion 46 elastically restores to its original shape. Accordingly, the bottom surface 46a of the engaging portion 46 engages with the portion of the panel P that is continuous with the attachment hole Pa. Due to the clamp being fixed to the panel P in this manner, the electric wires 20 held by the clamp 30 are fixed to the panel P.

Configuration of Holding Member 50

The holding members 50 each include a holding portion 51 that holds one electric wire 20, a shaft portion 53 that is inserted into one insertion hole 42, and a connecting portion 52 that connects the holding portion 51 to the shaft portion 53.

As shown in FIG. 4, the holding portion 51 is shaped as a rectangular plate that extends in the length direction of the electric wire 20. The width of the holding portion 51 is smaller than the width of the electric wire 20, more specifically, the width of the core wire 21. The holding portion 51 holds the electric wire 20 due to tape being wrapped around the holding portion 51 and the electric wire 20. The tape is wrapped around the electric wire 20 and the outer surface of the holding portion 51 on one side in the thickness direction of the electric wire 20, for example. In the present embodiment, the two end portions of the holding portion 51 in the length direction are fixed to the electric wire 20 by respective pieces of tape 60.

The shaft portion 53 has a prism shape, for example. The cross-sectional shape of the shaft portion 53 is square. The length of the diagonal line of the square is the same as the length of the diagonal line of the insertion hole 42.

As shown in FIG. 3, an engaging portion 54 is provided at the leading end of the shaft portion 53. The engaging portion 54 projects circumferentially outward from the leading end of the shaft portion 53. The engaging portion 54 has a conical shape, for example. The outer diameter of a bottom surface 54a of the engaging portion 54 is larger than the size of the insertion hole 42 in plan view.

The shaft portion 53 is configured to be able to be inserted into the insertion hole 42 through the slit 43. As the shaft portion 53 passes through the slit 43, the width of the slit 43 increases due to the base portion 41 elastically deforming such that portions thereof spread apart due to being pushed by the shaft portion 53. After the shaft portion 53 is inserted into the insertion hole 42, the slit 43 elastically restores to its original shape. Accordingly, the bottom surface 54a of the engaging portion 54 engages with a portion of the base portion 41 that is continuous with the insertion hole 42. At this time, the inner surface of the insertion hole 42 engages with the outer surface of the shaft portion 53 as described above. The holding member 50 is thus fixed to the fixing member 40.

The connecting portion 52 connects one end of the holding portion 51 in the width direction to the shaft portion 53. The connecting portion 52 has a prism shape, for example. The connecting portion 52 extends from the central portion, with respect to the length direction, of the one end of the holding portion 51. In other words, the holding portion 51 extends from the connecting portion 52 toward both sides in the length direction of the electric wire 20.

(Configuration of Wire Harness 10)

As shown in FIG. 1, the wire harness 10 includes first bent portions 10A that are bent in the Z-axis direction from a portion routed under the floor of the vehicle V toward the interior of the vehicle. The orientation of the two electric wires 20 in the first bent portions 10A is an orientation in which the core wires 21 of the two electric wires 20 are arranged side by side in the width direction. In the first bent portions 10A, the two electric wires 20 are bent in the thickness direction. At positions directly before and directly after each of the first bent portions 10A in the wire harness 10, the orientation of the two electric wires 20 is the same as the orientation of the two electric wires 20 in the first bent portion 10A.

As shown in FIG. 2, the wire harness 10 includes second bent portions 10B that are bent in the Y-axis direction from a portion extending in the X-axis direction. The second bent portions 10B are provided in the portion of the wire harness 10 that is routed under the floor of the vehicle V, for example. The orientation of the two electric wires 20 in the second bent portions 10B is an orientation in which the core wires 21 of the two electric wires 20 are arranged side by side in the thickness direction. In the second bent portions 10B, the two electric wires 20 are bent in the thickness direction. At positions directly before and directly after each of the second bent portions 10B in the wire harness 10, the orientation of the two electric wires 20 is the same as the orientation of the two electric wires 20 in the second bent portion 10B.

In the portion of the wire harness 10 that is between a first bent portion 10A and a second bent portion 10B and is routed under the floor of the vehicle V, the two electric wires 20 are inclined relative to the panel P. More specifically, the core wires 21 of the two electric wires 20 are each inclined relative to the panel P such that the distance between the core wires 21 increases with increasing distance from the panel P in the Z-axis direction.

The clamps 30 of the present embodiment include first clamps 31, second clamps 32, and third clamps 33. The clamps 31 to 33 are different from each other in terms of the angle of the connecting portion 52 relative to the shaft portion 53 of the holding member 50 described above.

Here, "the angle of the connecting portion 52 relative to the shaft portion 53" in this specification refers to the angle formed between the axis of the shaft portion 53 and the outer surface of the connecting portion 52 located on the side opposite to the electric wire 20.

(Configuration of First Clamp 31)

As shown in FIG. 1, a first clamp 31 is provided on the two electric wires 20 at each of two positions directly before and directly after each first bent portion 10A. As shown in FIG. 3, the first clamps 31 each hold portions of the two electric wires 20 where the core wires 21 of the two electric wires 20 are arranged side by side in the width direction. An angle θ1 formed between the connecting portion 52 and the shaft portion 53 in each of the first clamps 31 is 90°, for example. At this time, axes L in the thickness direction of the core wires 21 are parallel to each other.

Here, the phrase "the axes L are parallel to each other" in this specification includes the case where the two axes L are separated from each other and the case where the two axes L match each other.

(Configuration of Second Clamp 32)

Figure 5:
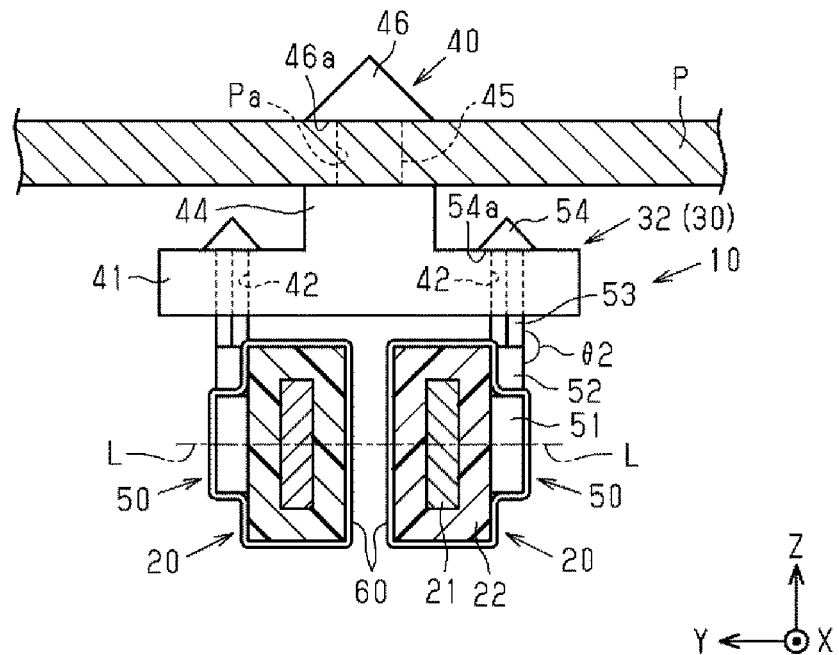
FIG. 5 is a cross-sectional view taken along line 5-5 in FIG. 2.

As shown in FIG. 2, a second clamp 32 is provided on the two electric wires 20 at each of two positions directly before and directly after a second bent portion 10B. As shown in FIG. 5, the second clamps 32 each hold portions of the two electric wires 20 where the core wires 21 of the two electric wires 20 are arranged side by side in the thickness direction. An angle θ2 formed between the connecting portion 52 and the shaft portion 53 in each of the second clamps 32 is 180°, for example. At this time, the axes L of the core wires 21 are parallel to each other.

(Configuration of Third Clamp 33)

Figure 6:
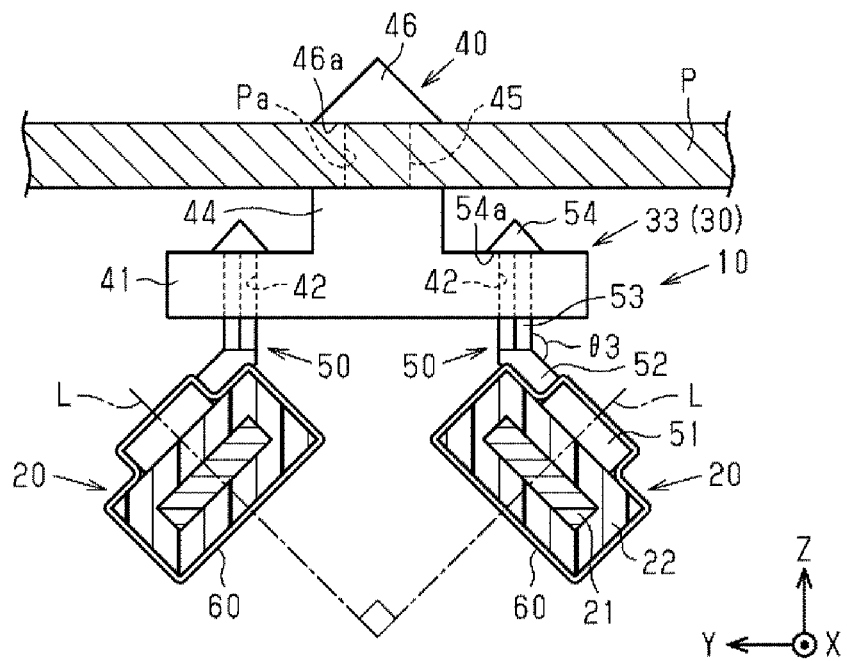
FIG. 6 is a cross-sectional view taken along line 6-6 in FIG. 1.

As shown in FIGS. 1 and 2, a plurality of third clamps 33 are provided on the two electric wires 20 at positions between a portion held by a first clamp 31 and a portion held by a second clamp 32. As shown in FIG. 6, the third clamps 33 each hold a portion of the two electric wires 20 in which the core wires 21 are each inclined relative to the fixing member 40 such that the distance between the core wires 21 increases with increasing distance from the fixing member 40 in the thickness direction of the base portion 41, that is to say in the Z-axis direction. An angle θ3 formed between the connecting portion 52 and the shaft portion 53 in each of the third clamps 33 is 135°, for example. At this time, the axes L of the core wires 21 form a right angle with each other.

The following describes operations of the present embodiment.

In each of the clamps 30, two holding members 50 can be attached to and detached from the fixing member 40. For this reason, by appropriately selecting two holding members 50 whose shapes correspond to the orientation of the two electric wires 20, it is possible to use the same fixing member 40.

The following describes effects of the present embodiment.

(1) A clamp 30 includes a fixing member 40 that is fixable to a panel P, and two holding members 50 that are attachable to and detachable from the fixing member 40 and configured to hold two electric wires 20 in one-to-one correspondence.

According to this configuration, the above-described effects are achieved, thus making it possible to improve the versatility of the clamp 30.

(2) A base portion 41 of the fixing member 40 has two insertion holes 42 spaced apart in an arrangement direction in which the two electric wires 20 are arranged side by side. Each of the holding members 50 includes a holding portion 51 configured to hold the corresponding electric wire 20, a shaft portion 53 that is insertable into a corresponding insertion hole 42 of the base portion 41, and a connecting portion 52 that connects the holding portion 51 and the shaft portion 53.

According to this configuration, by appropriately setting the configuration of the connecting portion 52, such as changing the angle formed between the connecting portion 52 and the shaft portion 53, it is possible to easily obtain two holding members whose shapes correspond to the orientation of the two electric wires 20.

(3) Each of the insertion holes 42 includes a restricting portion 42a configured to engage with the corresponding shaft portion 53 to restrict rotation of the shaft portion 53.

According to this configuration, the insertion holes 42 include the restricting portions 42a that restrict rotation of the shaft portions 53, and thus the holding members are positioned relative to the fixing member 40. Therefore, the two electric wires can be stably held in a desired orientation.

(4) Each of the holding portions 51 holds the corresponding electric wire 20 due to tape being wrapped around the holding portion 51 and the electric wire 20.

According to this configuration, tape is wrapped around the electric wire 20 and the holding portion 51, and thus the electric wire 20 is held by the holding member Therefore, the clamp 30 can hold a plurality of types of electric wires 20 having different outer dimensions. Accordingly, the versatility of the clamp 30 can be further improved.

Also, according to the above configuration, the holding members 50 can be attached to and detached from the fixing member 40, and therefore tape can be wrapped around a holding portion 51 and an electric wire 20 before the holding member 50 is attached to the fixing member 40, and then the holding member 50 can be attached to the fixing member 40. This makes it possible to improve the workability when attaching the clamp 30 to the electric wires 20.

(5) The wire harness 10 includes two electric wires 20 arranged side by side, a first clamp 31, and a second clamp 32. The first clamp 31 is provided on the two electric wires 20 at a position directly before a first bent portion 10A. The second clamp 32 is provided on the two electric wires 20 at a position directly before a second bent portion 10B.

According to this configuration, the first clamp 31 is provided on the two electric wires 20 at a position directly before the first bent portion 10A. Therefore, the two electric wires 20 can be held in a state in which the thickness direction of each of the core wires 21 is aligned with the Z-axis direction. The second clamp 32 is provided on the two electric wires 20 at a position directly before the second bent portion 10B. Therefore, the two electric wires 20 can be held in a state in which the thickness direction of each of the core wires 21 is aligned with the Y-axis direction.

Moreover, according to the above configuration, the two holding members 50 can be attached to and detached from the fixing member 40. Therefore, the same fixing member 40 can be used in both the first clamp 31 and the second clamp 32. Accordingly, it is possible to improve the versatility of the clamp 30 and thus the versatility of the wire harness 10.

(6) The wire harness 10 includes a third clamp 33. The third clamp 33 holds a portion of the two electric wires 20 that is between the portion held by the first clamp 31 and the portion held by the second clamp 32, the portion held by the third clamp 33 being a portion in which the core wires 21 of the two electric wires 20 are each inclined relative to the fixing member 40 such that the distance between the core wires 21 increases with increasing distance from the fixing member 40 in the Z-axis direction.

According to this configuration, in the portion of the two electric wires 20 between the portion held by the first clamp 31 and the portion held by the second clamp 32, the core wires 21 of the two electric wires 20 are each inclined relative to the fixing member 40 such that the distance between the core wires 21 increases with increasing distance from the fixing member 40 in the Z-axis direction. Therefore, according to the above configuration, the two electric wires 20 can be stably held in the portion of the two electric wires 20 between the portion held by the first clamp 31 and the portion held by the second clamp 32.

<Variations>

The present embodiment can be implemented with modifications such as the following. The present embodiment and the following variations can be implemented in combination with each other as long as no technical contradiction arises.

The number of clamps 31 to 33 can be changed as appropriate.

The third clamp 33 can be omitted from the wire harness 10. In other words, the wire harness 10 may include only the first clamp 31 and the second clamp 32 as the clamps 30.

The third clamp 33 may hold the portion in which the core wires 21 of the two electric wires 20 are each inclined relative to the fixing member 40 such that the distance between the core wires 21 decreases with increasing distance from the fixing member 40. In this case, the third clamp 33 may have a configuration in which the two holding members 50 in the above embodiment are switched, and the angle θ3 formed between the connecting portion 52 and the shaft portion 53 is smaller than 90°.

The holding portion 51 may extend from the connecting portion 52 in only one direction in the length direction of the electric wire 20.

The holding portion 51 may hold the electric wire 20 by sandwiching the electric wire 20 in the width direction or the thickness direction. In this case, the tape 60 can also be omitted.

The shape of the insertion hole 42 in plan view and the cross-sectional shape of the shaft portion 53 may be a polygonal shape other than a pentagonal shape, such as a triangular shape.

Rotation of the shaft portion 53 can also be restricted by engagement between a protruding portion on the inner surface of the insertion hole 42 and a receding portion provided on the outer surface of the shaft portion 53. In this case, the protruding portion of the insertion hole 42 functions as the restricting portion 42a. Similarly, rotation of the shaft portion 53 can be restricted by engagement between a receding portion provided on the inner surface of the insertion hole 42 and a protruding portion provided on the outer surface of the shaft portion 53. In this case, the receding portion of the insertion hole 42 functions as the restricting portion 42a.

The restricting portion 42a can be omitted from the insertion hole 42. In this case, at least either the shape of the insertion hole 42 in plan view or the cross-sectional shape of the shaft portion 53 may be circular, for example.

The slit 43 can be omitted from the base portion 41. In this case, the insertion hole 42 in the above embodiment has a square shape in plan view.

The angle formed between the connecting portion 52 and the shaft portion 53 in the holding member 50 can be appropriately changed according to the orientation of the two electric wires 20.

The clamp 30 is not limited to being fixed to the panel P. Alternatively, the clamp 30 may be fixed to the frame of the vehicle V. Also, the clamp 30 may be fixed to a bracket attached to the aforementioned frame or the panel P.

Although the wire harness 10 electrically connects an inverter and a high-voltage battery, the present invention is not limited to this. The wire harness 10 is applicable to a wire harness for electrically connecting various electrical devices provided in the vehicle V.

The present disclosure includes aspects such as the following. Some constituent elements of exemplary embodiments have been given reference signs in order to facilitate understanding and not for limitation. Portions of the matter described in the following embodiments may be omitted, and portions of the matter described in the embodiments may be selected or extracted and combined with each other.

[Supplementary Note 1] A clamp (30) according to an aspect of the present disclosure is a clamp (30) for holding two electric wires (20) arranged side by side, each of the electric wires (20) including a core wire (21) having a flattened cross-sectional shape, the clamp (30) including:

a fixing member (40) attachable to and detachable from a fixing target; and two holding members (50) attachable to and detachable from the fixing member (40) and configured to hold the two electric wires (20) in one-to-one correspondence.

[Supplementary Note 2] In some embodiments, a configuration is possible in which the fixing member (40) includes an engaging portion (46) capable of elastic deformation, and the fixing target has an attachment hole (Pa) through which the engaging portion (46) is passable.

[Supplementary Note 3] In some embodiments, a configuration is possible in which the fixing member (40) includes a base portion (41), and the two holding members (50) are detachably attached to the base portion (41).

[Supplementary Note 4] In some embodiments, a configuration is possible in which the fixing member (40) has two edges in a lengthwise direction, two slits (43) extending toward each other from the two edges respectively, and two insertion holes (42) respectively connected to the two slits (43).

[Supplementary Note 5] In some embodiments, a configuration is possible in which each of the holding members (50) is configured to pass through a corresponding one of the slits (43) and be mounted to a corresponding one of the insertion holes (42).

[Supplementary Note 6] In some embodiments, a configuration is possible in which each of the holding members (50) includes a holding portion (51) configured to hold the corresponding electric wire (20), a shaft portion (53) configured to be mounted to the fixing member (40), and a connecting portion (52) connecting the holding portion (51) and the shaft portion (53), the clamp (30) is any one of a first clamp (31), a second clamp (32), and a third clamp (33), and the shaft portions (53) of the first clamp (31), the second clamp (32), and the third clamp (33) all have the same shape, and the connecting portions (52) of the first clamp (31), the second clamp (32), and the third clamp (33) extend in different directions relative to axes of the shaft portions (53).

[Supplementary Note 7] In some embodiments, a configuration is possible in which the first clamp (31) includes the connecting portion (52) orthogonal to the shaft portion (53).

[Supplementary Note 8] In some embodiments, a configuration is possible in which the second clamp (32) includes the connecting portion (52) extending in the same direction as the shaft portion (53).

[Supplementary Note 9] In some embodiments, a configuration is possible in which the third clamp (33) includes the connecting portion (52) obliquely intersecting the shaft portion (53).

[Supplementary Note 10] A clamp (30) according to an aspect of the present disclosure is a clamp (30) for holding two electric wires (20) arranged side by side, each of the electric wires (20) including a core wire (21) having a flattened cross-sectional shape, the clamp (30) including:

a fixing member (40) attachable to and detachable from a fixing target; and two holding members (50) attachable to and detachable from the fixing member (40) and configured to hold the two electric wires (20) in one-to-one correspondence, wherein each of the holding members (50) includes a holding portion (51) configured to hold the corresponding electric wire (20), a shaft portion (53) configured to be mounted to the fixing member (40), and a connecting portion (52) connecting the holding portion (51) and the shaft portion (53), and a plurality of types of the clamps (30) in which the connecting portions (52) extend in different directions relative to axes of the shaft portions (53) can be replaceably mounted to the fixing member (40).

[Supplementary Note 11] A wire harness (10) according to an aspect of the present disclosure includes:

two electric wires (20) arranged side by side and each including a core wire (21) having a flattened cross-sectional shape; and a clamp configured to hold the two electric wires (20), the clamp (30) including:

a fixing member (40) attachable to and detachable from a fixing target; and two holding members (50) attachable to and detachable from the fixing member (40) and configured to hold the two electric wires (20) in one-to-one correspondence, wherein each of the holding members (50) includes a holding portion (51) configured to hold the corresponding electric wire (20), a shaft portion (53) configured to be mounted to the fixing member (40), and a connecting portion (52) connecting the holding portion (51) and the shaft portion (53), and a plurality of types of the clamps (30) in which the connecting portions (52) extend in different directions relative to axes of the shaft portions (53) can be replaceably mounted to the fixing member (40).

LIST OF REFERENCE NUMERALS

L . . . Axis
$\theta 1$ . . . Angle
$\theta 2$ . . . Angle
$\theta 3$ . . . Angle
C1 . . . Connector
C2 . . . Connector
P . . . Panel
Pa . . . Attachment hole
V . . . Vehicle
1 . . . Inverter
2 . . . High-voltage battery
10 . . . Wire harness
10A . . . First bent portion
10B . . . Second bent portion
20 . . . Electric wire
21 . . . Core wire
22 . . . Insulating coating
30 . . . Clamp
31 . . . First clamp
32 . . . Second clamp
33 . . . Third clamp
40 . . . Fixing member
41 . . . Base portion
42 . . . Insertion hole
42a . . . Restricting portion
43 . . . Slit
44 . . . Projecting portion
45 . . . Support shaft
46 . . . Engaging portion
46a . . . Bottom surface
50 . . . Holding member
51 . . . Holding portion
52 . . . Connecting portion
53 . . . Shaft portion
54 . . . Engaging portion
54a . . . Bottom surface
60 . . . Tape

What is claimed is:

1. A clamp applicable to two electric wires arranged side by side and each including a core wire having a flattened cross-sectional shape, the clamp being configured to be fixed to a fixing target and hold the two electric wires, the clamp comprising:

a fixing member configured to be fixed to the fixing target; and two holding members attachable to and detachable from the fixing member and configured to hold the two electric wires in one-to-one correspondence.

2. The clamp according to claim 1, wherein the fixing member has two insertion holes spaced apart in a direction in which the two electric wires are arranged side by side, and each of the holding members includes a holding portion configured to hold the corresponding electric wire, a shaft portion configured to be inserted into a corresponding one of the insertion holes, and a connecting portion connecting the holding portion and the shaft portion.

3. The clamp according to claim 2, wherein each of the insertion holes includes a restricting portion configured to engage with the corresponding shaft portion to restrict rotation of the corresponding shaft portion.

4. The clamp according to claim 2 or 3,
wherein each of the holding portions holds the corresponding electric wire due to tape being wrapped around the holding portion and the electric wire.

5. A wire harness comprising:
two electric wires arranged side by side and each including a core wire; and
a plurality of clamps fixable to a fixing target, each of the clamps being configured to hold the two electric wires,
wherein a shape of a cross-section of each of the core wires taken orthogonal to a length direction of the core wires is a flattened shape having a size in a thickness direction that is smaller than a size in a width direction,
each of the clamps includes:
    a fixing member configured to be fixed to the fixing target; and
    two holding members attachable to and detachable from the fixing member and configured to hold the two electric wires in one-to-one correspondence,
the plurality of clamps include a first clamp and a second clamp,
the first clamp is configured to hold a portion of the two electric wires in which the core wires of the two electric wires are side by side with each other in the width direction, and
the second clamp is configured to hold a portion of the two electric wires in which the core wires of the two electric wires are side by side with each other in the thickness direction.

6. The wire harness according to claim 5,
wherein the plurality of clamps further include a third clamp, and
the third clamp is configured to hold a portion of the two electric wires that is between the portion held by the first clamp and the portion held by the second clamp, the portion held by the third clamp being a portion in which the core wires of the two electric wires are each inclined relative to the fixing member such that a distance between the core wires changes with increasing distance from the fixing member.

* * * * *